UNITED STATES PATENT OFFICE.

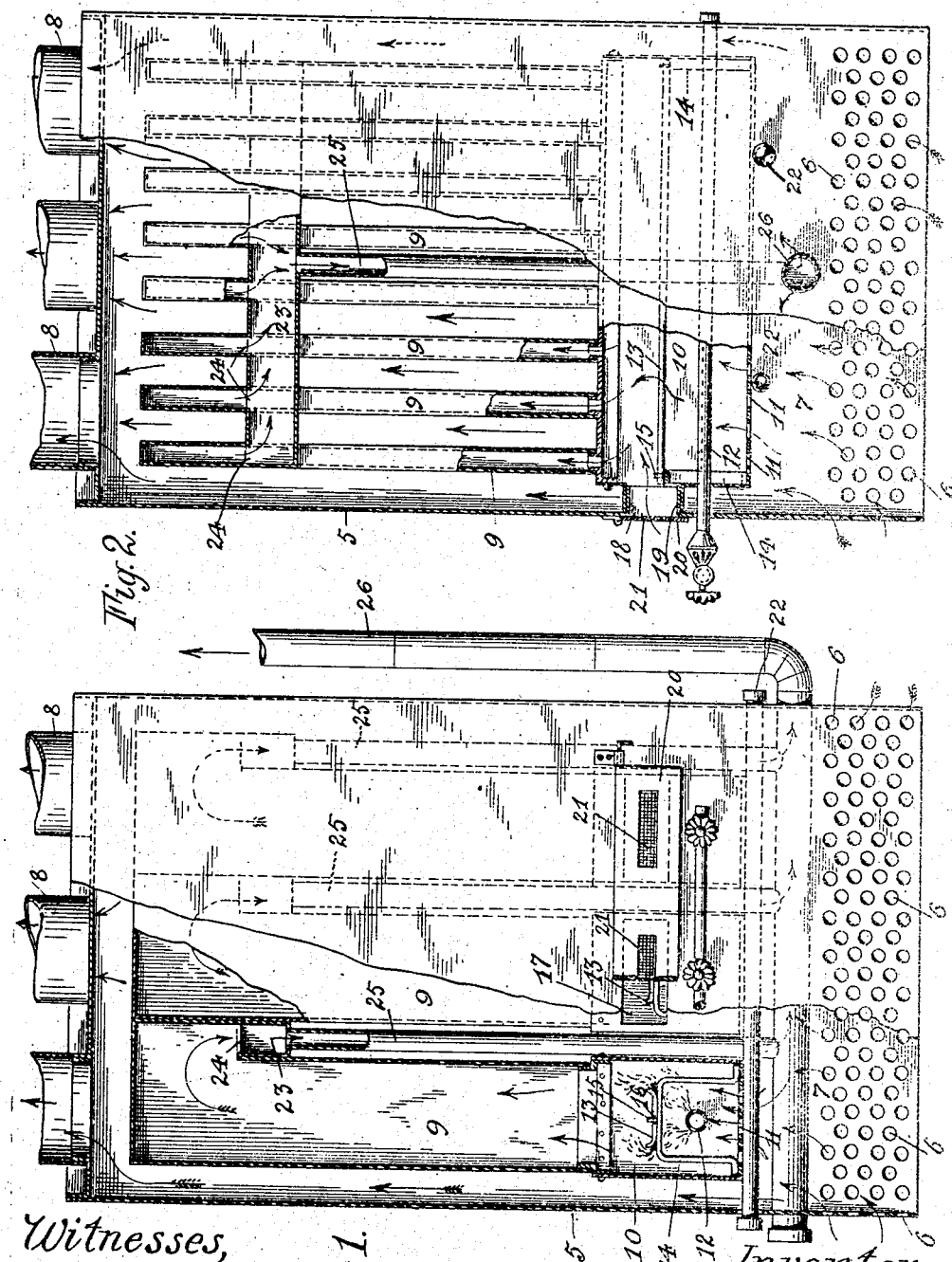

LOUIS H. FREYMUTH, OF LOS ANGELES, CALIFORNIA.

HEATING APPARATUS.

948,488.

Specification of Letters Patent. Patented Feb. 8, 1910.

Application filed May 10, 1909. Serial No. 495,060.

*To all whom it may concern:*

Be it known that I, LOUIS H. FREYMUTH, a citizen of the United States, residing in the city of Los Angeles, county of Los Angeles and State of California, have invented new and useful Improvements in Heating Apparatus, of which the following is a specification.

My invention relates to improvements in apparatus used for heating dwelling houses or other structures in which the fuel used is gas or other vapor fuel, and the object thereof is to produce a simple efficient and economical apparatus for that purpose which will heat the air without contaminating the same by any of the products of combustion.

I accomplish the object thereof by the apparatus described herein and illustrated in the accompanying drawings in which;

Figure 1 is an end elevation partly in section and partly broken away, of my improved apparatus. Fig. 2 is a side elevation partly in section and partly broken away, of my improved apparatus.

In the drawings the outer casing of the jacket is composed of a sheet iron body 5 which may be lined with asbestos if desired. Near the bottom the outer jacket is perforated by perforations 6 through which the air for all purposes passes, into what may be termed the air distributing chamber 7. To the top of the outer jacket are connected the conducting flues 8 which carry the heated air to the places of use not shown. Within the outer jacket and suitably spaced therefrom are batteries of radiating flues 9 which are open at the bottom into the combustion chamber 10, and are closed at the top. The top portions of these flues are broader than the lower or body portions. The higher portions abut against each other and project over the space which separates the battery of flues from the adjacent one.

In the drawings I have shown three batteries of flues, each battery being composed of eight flues, but any number of flues may be used. Below each battery of flues is a combustion chamber 10 which extends longitudinally under the flues. The combustion chamber has perforations 11 in the bottom thereof through which the principal amount of air used for combustion passes. Extending longitudinally through the combustion chambers are gas or vapor burners 12 of any approved construction, there being a burner for each combustion chamber. Within the combustion chamber above the burners are spreader plates 13 which spread the flame from the burners. These spreader plates are preferably of cast iron and are supported by U-shaped supports 14 of which there are preferably one at each end, which are provided with pins 15 that project into notches 16 in the ends of the plate. At the front end of each combustion chamber is an opening 17 and a like opening 18 in the outer casing. These openings are connected by a pipe 19, thereby providing a cased opening into each combustion chamber from the front end thereof. These openings are covered by a hinged door 20, which is provided with screened openings 21 opposite or in register with each opening into the combustion chamber. These openings and door provide convenient means for lighting the burners and inspecting the interior of the combustion chamber. The flues rest upon the top of the combustion chamber and are in communication therewith through ports at the bottom of the flues. The combustion chamber is supported by pipes 22 which pass through the outer casing, there being preferably a pipe near each end of the combustion chamber. Running longitudinally between the battery of flues just below the broad top portions are fume conduits 23 which have openings 24 in the top thereof which register with the bottom of the wide top portion of the radiating flues. Opening from the bottom of these fume conduits are branch waste pipes 25 which connect with the waste pipe 26 which carries the fumes to a chimney not shown. By connecting the flues to the fume conduits at a point below the top thereof I am able to dispose of the fumes with but little loss of heat, as almost all the heat from the fumes is radiated into the air around the flues and the conduits and pipes. By connecting the fume conduits to the waste pipe within the outer casing at a point below the burners, heat is conserved, which would pass off if they were connected to the waste flue outside of and at the top of the apparatus. By arranging the flues in batteries the air to be heated is divided into a considerable number of ascending columns, which is subjected to the radiation of the heat from the walls of the radiating flues, and also to the radiation of the walls of the combustion chamber and pipes between the flues and fume conduits on its way to its place of use.

Having described my invention what I claim is:

1. A heating apparatus composed of an outer casing having the side and end walls thereof perforated at the bottom, said casing having an air distributing chamber within the lower portion thereof, said perforated portion of the casing forming the end and side walls of said air distributing chamber; a battery of radiating flues having closed tops within said outer casing, said tops being broader than the body thereof; a combustion chamber below said battery of flues and in communication therewith, said combustion chamber forming a portion of the top of said air distributing chamber; a vapor burner within said combustion chamber; a fume conduit connected to said radiating flues at a distance below the top thereof about one fourth the height of the flue; a waste pipe connected to said fume conduit and leading downwardly and outwardly through said outer casing; and conducting flues connected with the top of said outer casing, said conducting flues being adapted to carry the heated air to the place of use.

2. A heating apparatus composed of an outer casing having the lower portions of the walls thereof perforated, said casing having an air distributing chamber within the lower portion thereof, said perforated portion of the casing forming the end and side walls of said distributing chamber; a plurality of batteries of radiating flues, all the flues having closed tops broader than the body thereof within said outer casing, the top portions of which to the extent of about one fourth thereof have the adjacent walls touching and the narrower portions separated to form flues therebetween; fume conduits connected to said batteries of radiating flues at the bottom of the broadened portion thereof; waste pipes connected to said fume conduits leading downwardly and then outwardly out of said outer casing; a combustion chamber below each of said batteries of flues and in communication therewith, each of said combustion chambers forming a portion of the top of said air distributing chamber; a vapor burner within each of said combustion chambers; spreader plates within said combustion chambers over said vapor burners; and conducting flues connected to the top of said outer casing, said conducting flues being adapted to carry the heated air to the place of use.

3. A heating apparatus composed of an outer casing having the side and end walls thereof perforated at the bottom, said casing having an air distributing chamber within the lower portion thereof, said perforated portion of the casing forming the end and side walls of said air distributing chamber; a plurality of combustion chambers within said outer casing and passing across and forming a portion of the top of said air distributing chamber; a plurality of batteries of radiating flues each battery of flues having tops broader than the bodies thereof within said casing, being closed at the top and opening at the bottom into the combustion chambers, said batteries of radiating flues having the top portions thereof to the extent of about one fourth, with the adjacent walls touching and the narrower portions separated to form flues therebetween; a vapor burner within each combustion chamber, there being one combustion chamber for each battery of flues; fume conduits connected to the radiating flues at the bottom of the broadened portion thereof; a branch waste pipe leading downwardly from each of said fume conduits and opening into a common waste pipe below the combustion chambers; and a common waste pipe in the air distributing chamber passing outwardly therefrom.

In witness that I claim the foregoing I have hereunto subscribed my name this 1st day of May, 1909.

LOUIS H. FREYMUTH.

Witnesses:
G. E. HARPHAM,
S. B. AUSTIN.